[11] 3,601,692

[72] Inventor Nick A. Schuster
 Darien, Conn.
[21] Appl. No. 824,981
[22] Filed May 15, 1969
[45] Patented Aug. 24, 1971
[73] Assignee Schlumberger Technology Corporation
 New York, N.Y.

[54] ELECTRICAL LOGGING SYSTEM UTILIZING IMPEDANCE MEANS BETWEEN SURVEY AND MEASURE ELECTRODES
 6 Claims, 4 Drawing Figs.
[52] U.S. Cl. ................................................ 324/10
[51] Int. Cl. ................................................ G01v 3/18
[50] Field of Search .................................... 324/10, 1

[56] References Cited
 UNITED STATES PATENTS
 2,288,884 7/1942 Bowsky .................... 324/1
 2,712,629 7/1955 Doll .......................... 324/10
 2,941,784 6/1960 Martin ...................... 324/10

Primary Examiner—Gerard R. Strecker
Attorneys—Donald H. Fidler, Edward M. Roney, William R. Sherman, William J. Beard, Stewart F. Moore, Jerry M. Presson and Leonard R. Fellen ABSTRACT: In accordance with illustrative embodiments of the present invention, a well tool having wall-engaging pad members is moved through a borehole. Current is supplied to a current electrode A on each pad member and the resulting potential on a nearby electrode M on each pad member is measured to provide a measure of formation resistivity. A shunt resistor is connected between the A- and M-electrodes of each pad member and has a resistance value suitable to enable the system to provide reasonably accurate measurements when the A- and/or M-electrodes fail to make reasonably good electrical contact with the formation. However, when the contact resistance between the A- and M-electrodes is so bad that genuine resistivity measurements cannot be made, the measuring system will produce very high, off-scale measurement values to indicate such an occurrence. In another embodiment of the invention, the electrodes are energized with current at a plurality of frequencies to enable separate measurements to be made. These measurements when utilized in a desirable manner, can enable a relatively authentic resistivity measurement to be obtained.

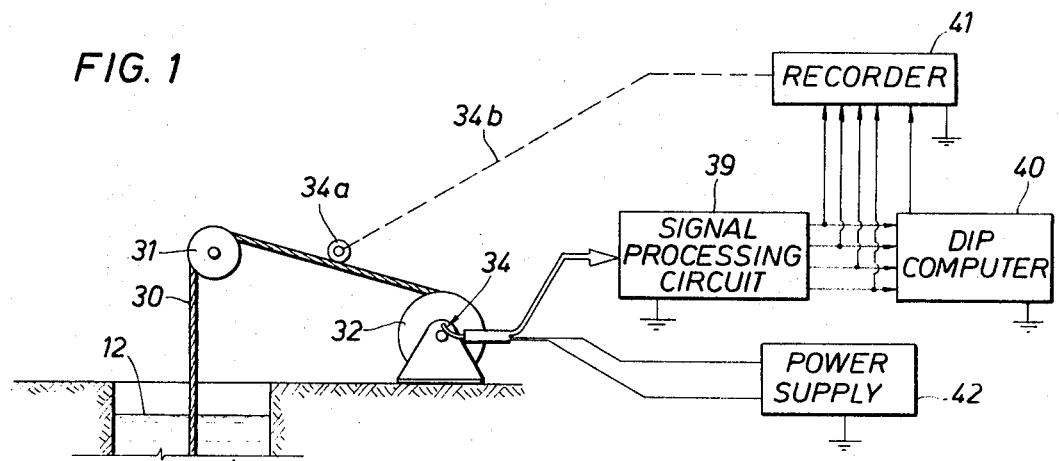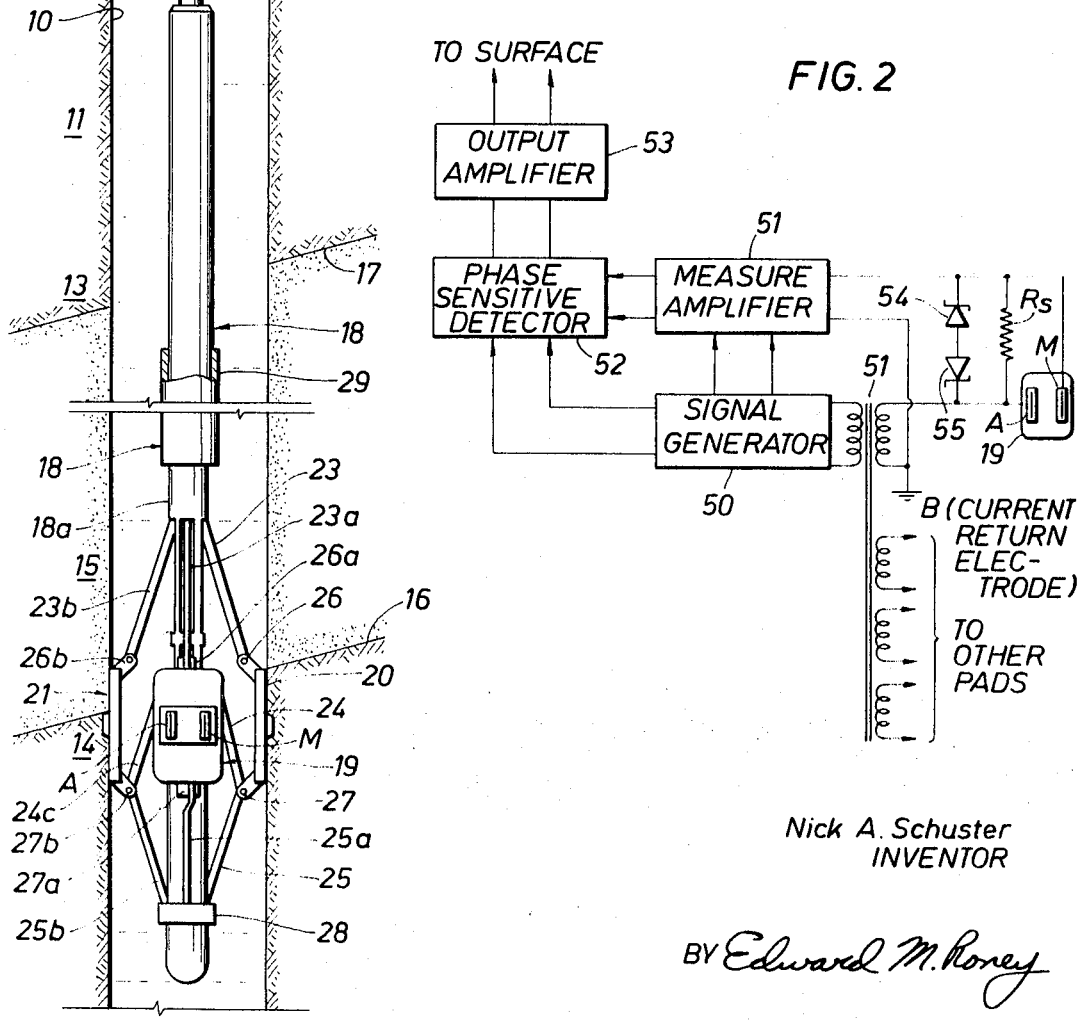

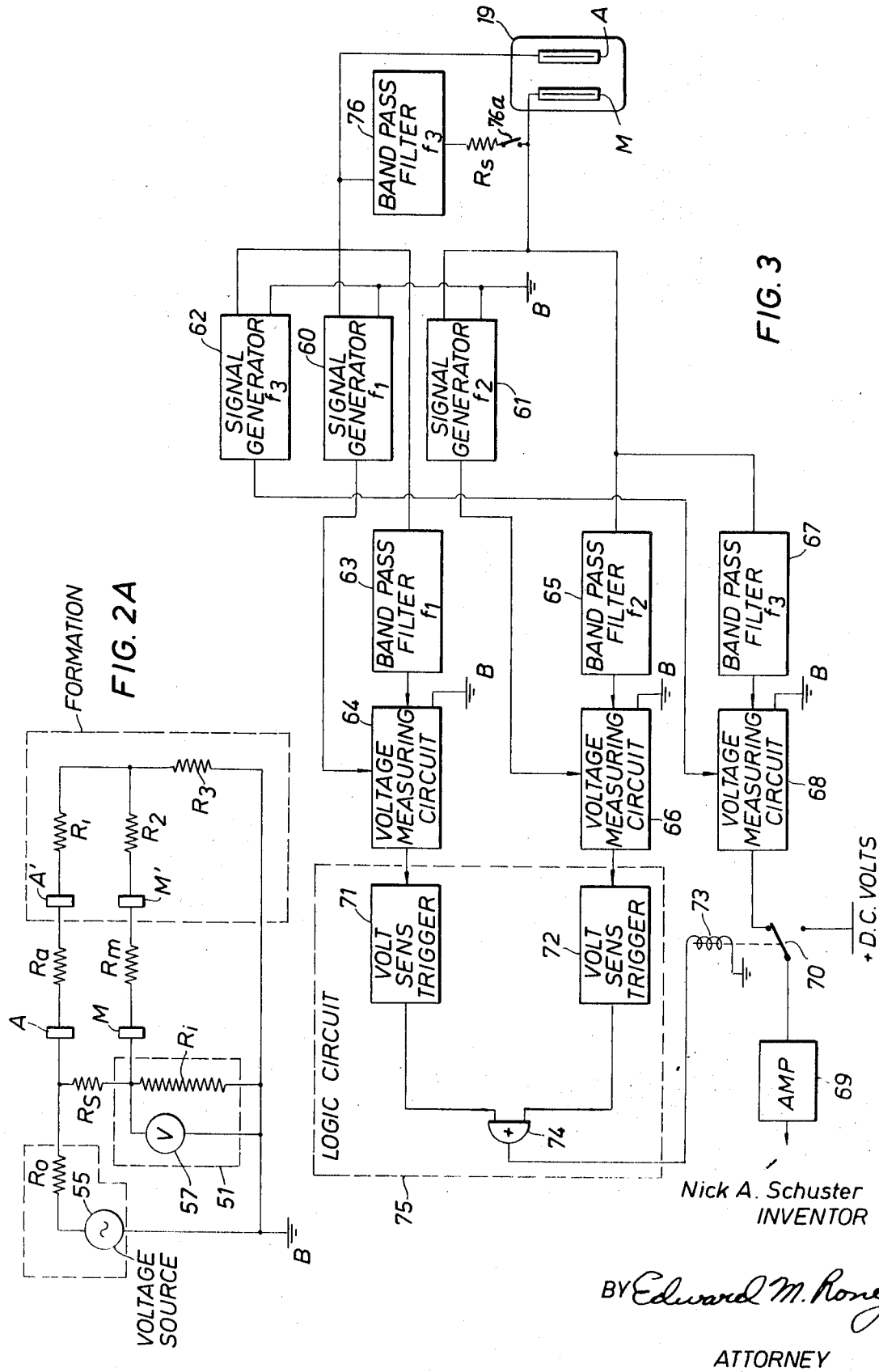

ELECTRICAL LOGGING SYSTEM UTILIZING IMPEDANCE MEANS BETWEEN SURVEY AND MEASURE ELECTRODES

This invention relates to methods and apparatus for investigating subsurface earth formations traversed by a borehole, and more particularly to that type of investigating apparatus which emits current into the adjoining earth formations and measures the resistance of those formations to the flow of the emitted current.

When investigating the resistivity or conductivity of subsurface earth formations, a system of electrodes is moved through the borehole on the end of a cable and current is emitted from one or more of these electrodes for passage through the formations. One popular type of electrical well-logging apparatus is the so-called "pad-mounted electrode" system where electrodes are mounted on pads which are adapted to engage the borehole wall. By placing the electrodes on wall-engaging pad members, better electrical contact with the formations adjoining the borehole can be obtained.

There are several well-known techniques for measuring formation resistivity with such pad-mounted electrode systems. One is to emit a constant current from one pad-mounted electrode, which current returns to a relatively remote electrode, and measure the voltage on the current-emitting electrode. Such a system is usually referred to as a "monoelectrode" measuring system. Another technique is to measure the potential on a second pad-mounted electrode near the current-emitting electrode. Such a system is usually referred to as a "short normal" system.

When investigating formations adjoining a borehole filled with high-resistance oil base mud, even such pad-mounted electrode systems sometimes fail to provide a true measure of the formation resistivity or conductivity. The reason for this is that a thin film of this oil base mud is many times formed between the electrodes and the mudcake lining the borehole wall thus causing a high contact resistance between the electrodes and formation. This problem has been alleviated to some extent over the years by utilizing so-called "scratcher" or "knife edge" electrodes to cut through this mudcake and make contact with the formations behind the mudcake. Unfortunately, these scratcher electrodes do not always make good contact with the formation for various reasons and thus the resulting measurements are sometimes in error.

The most obvious solution to this problem is to utilize a plurality of electrodes connected in parallel fashion to the energizing circuit and hope that at least one of these electrodes will make good contact with the formation. However, even in such parallel electrode systems, if all of the electrodes have some contact resistance, even a relatively low contact resistance, the resulting measurements will be in error. Furthermore, it is many times the case that a borehole condition causing one of the electrodes to have a significant contact resistance will also cause any nearby electrodes to have substantially the same contact resistance and thus such parallel electrode systems are many times ineffective. A short normal device, on the other hand, will give relatively accurate resistivity measurements for relatively low values of contact resistance. However, when the contact resistance becomes too high, the measurements will be too much in error to be useful. Moreover, for reasons to be explained later, it is many times impossible to determine when an error has, in fact, been produced by such a short normal device.

One typical service where such pad-mounted electrode systems are utilized is the so-called "dipmeter survey." In running dipmeter logs, a plurality of pad-mounted electrode systems are disposed around the circumference of the borehole wall and the logs obtained from each pad-mounted electrode system are compared for similarities so as to establish the dip of formation beds. When using logs for this purpose, it is not so important that the resistivity measurements obtained from each electrode system are absolutely correct and thus some degree of error brought about because of the above-mentioned contact problems is tolerable. However, there is, of course, a limit to the amount of error that can be tolerated even when the logs are only used for correlation purposes. It has been found that when logging in oil base mud boreholes, the above-mentioned monoelectrode and short normal devices exceed this limit too often. Moreover, since it is many times impossible when using a short normal device to determine if an error has, in fact, been produced, an inaccurate correlation may result.

It is therefore, an object of the present invention to provide new and improved methods and apparatus for investigating subsurface earth formations.

It is another object of the present invention to provide new and improved methods and apparatus for measuring the resistivity or conductivity of subsurface earth formations surrounding a borehole filled with a high-resistance material.

In accordance with the present invention, apparatus for use in investigating subsurface earth formations traversed by a borehole comprises a plurality of electrodes adapted for movement through a borehole and means for supplying current between first and second ones of the electrodes for emission into an earth formation. The potential on a third one of the electrodes which is located near the first electrode is measured to provide a measure of a formation characteristic and an impedance means is connected between the first and third electrodes for providing a current path through the impedance means to the third electrode and the measuring means. By so doing, whenever the first and/or third electrode loses contact with the earth formation, reasonably accurate measurements of the formation characteristic can still be obtained.

For a better understanding of the present invention, together with other and further objects thereof, reference is had to the following description taken in connection with the accompanying drawings, the scope of the invention being pointed out in the appended claims.

Referring to the drawings:

FIG. 1 shows a pad-mounted electrode-type investigating apparatus for investigating subsurface earth formations along with representations of electrical circuitry at the surface of the earth for powering the downhole-investigating apparatus and receiving the resulting resistivity measurements therefrom;

FIG. 2 shows a schematic representation of one embodiment of electrical circuitry in accordance with the present invention;

FIG. 2A shows the equivalent electrical circuit for the apparatus of FIG. 2; and FIG. 3 illustrates another embodiment of the present invention.

Referring to FIG. 1, there is shown an investigating apparatus in a borehole 10 for investigating earth formations 11. The borehole 10 has a suitable drilling mud located therein. Typical earth formations are represented by shale formations 13 and 14 with an intervening sand formation 15. Typical boundaries 16 and 17 are shown between the different formations. The downhole-investigating apparatus includes an elongated support member 18 adapted for movement through the borehole 10. The upper end of the support member 18 is connected by means of an armored multiconductor cable 30 to suitable apparatus at the surface of the earth for raising and lowering the downhole-investigating apparatus through the borehole 10. To this end, the multiconductor cable 30 passes over a sheave 31 and then to a suitable drum and winch mechanism 32.

The downhole-investigating apparatus additionally includes four pads designated 19, 20, 21 and 22 (the front pad member 19 obscures the view of the back pad member 22, which is not shown). The pad members 19–22 are adapted to be pushed outward and away from the central support member 18 toward the wall of the borehole. To accomplish this, concerning pad 20 only, suitable support arms 23, 24 and 25 are pivotally coupled between the electrode pad 20 and housing 18, the support arms being pivotally connected at points 26 and 27 by suitable hinge means. The lower end of support arm 25 is pivotally coupled to a slidable collar member 28. The other pad members 19, 21 and 22 are coupled to the support member 18 in the same manner and have the same numerical designations except that the reference numerals "a" and "b" have been assigned to pads 19 and 21 respectively to show the similar apparatus. Suitable actuating means are contained within the housing 18 for urging the upper support arms outwardly thereby to urge the electrode pads against the borehole wall. This multiple-pad configuration of FIG. 1 is useful in obtaining logs which can be used to determine the dip of formation bedding planes.

Each of the pads are desirably made of a suitable wear resistant and electrically insulating material. A pair of electrodes, designated A and M, are embedded in each pad member in a suitable manner. The arms 23, 24, 25, 23a, 24a, etc., the central support member 18 and the armor of cable 30 are all electrically connected together and comprise a composite current return electrode, designated "B", which is relatively remote from the A and M electrodes and to which the currents emitted from the various pad-mounted electrodes are returned. Since so much metal is used to make up the current return electrode, the emitted current, once it is in the formation, will have a relatively low-impedance path to the return electrode and thus the high resistance mud will not adversely affect this return electrode.

The interiors of the upper support arms 23, 23a, and 23b (as well as the hidden pad 22) are hollow and the insulated electrical conductors from each electrode pad extend through the corresponding arms thereof to suitable electrical circuits contained within a fluidtight instrument housing within support member 18.

Electrical connection between the various conductors of the multiconductor cable 30 and the various electrical circuits at the surface of the earth is accomplished by means of a suitable multielement slip ring and brush contact assembly 34. In this manner, the signals which originate from the downhole investigating apparatus are supplied to a signal-processing circuit 39 which supplies the processed signals to a dip computer 40 and a recorder 41, the dip computer 40 also supplying a signal to recorder 41. Additionally, a suitable power supply 42 supplies current downhole to power the downhole circuits.

Now referring to FIG. 2, there is shown the electrical circuitry connected to the electrodes of FIG. 1. A signal generator 50 supplies a substantially constant AC current via a transformer 51 between one of the electrodes, designated A, of each pad member and the composite current return electrode for emission into the surrounding formations. Since the circuitry associated with each one of the pads is the same, this circuitry will only be shown and described in FIG. 2 in connection with one pad member 19.

The potential difference between the adjacent electrode M on the pad member 19 and the current return electrode B is measured by a suitable high input impedance measure amplifier 51 whose output signal is applied to a phase-sensitive detector 52. The phase reference signal for detector 52 is derived from the signal generator 50 such that the detector 52 will produce a DC output signal proportional to that portion of the signal output from measure amplifier 51 which is in phase with the current emitted by the electrode A. In this fashion, the output signal from the phase sensitive detector 52 will be proportional to the formation resistivity. This resistivity signal is applied to an output amplifier 53 for transmission to the signal processing circuits 39 at the surface of the earth for further processing.

In accordance with an important feature of the present invention, a resistor $R_s$ is connected across the conductors connected to the A and M electrodes and has a resistance value which is much larger than the formation resistance (between the A and return electrodes) and much less than the output resistance of signal generator 50 (as seen from the A electrode) and the input resistance to measure amplifier 51. A pair of back-to-back Zener diodes 54 and 55 shunt the resistor $R_s$ so as to limit the voltage that can be developed across $R_s$, and thus limit the power dissipated by $R_s$.

Now referring to FIG. 2A, there is shown an equivalent circuit of the circuitry of FIG. 2. In FIG. 2A, the signal generator 50 is replaced by a voltage source 55 and a high resistance output resistor $R_o$. The electrodes A and M make contact with the formation, represented by contacts A' and M' respectively, through contact resistances $R_a$ and $R_m$ respectively. These contact resistances $R_a$ and $R_m$ represent the resistance between the electrodes A and M and the adjoining formations and therefore are unknown quantities. The formation resistance is represented by a star network comprising resistors $R_1$, $R_2$ and $R_3$. The measure amplifier 51 input resistance is represented by the resistor $R_i$. An infinite impedance voltmeter 57 is connected across the resistor $R_i$ to give a measure of the voltage developed across this resistor $R_i$.

Before considering how the apparatus of FIG. 2 operates to measure formation resistivity, first consider how a so-called "monoelectrode" measuring device would measure formation resistivity. (Such a device can be visualized in FIG. 2A by considering that only the A electrode is used and the voltage on this single A electrode is measured). Assuming that the formation resistance between the current-emitting and current return electrodes of such a monoelectrode system were 1,000 ohms, it can be seen that if the contact resistance were also 1,000 ohms, the voltage measured between these A and B electrodes would be doubled the voltage measured when this monoelectrode were making good contact (assuming a constant current configuration). Likewise, if the contact resistance were 10,000 ohms, the resistivity measurements would be off by a factor of approximately 10, and so on.

Now consider what happens with the equivalent circuit of FIG. 2A operating as a "short normal" circuit, i.e., without the shunting resistor $R_s$. For present purposes, assume that $R_1=R_2=500$ ohms and $R_3=1,000$ ohms, $V_{source}=100$ volts, and $R_i=R_o=1$ megohms. First considering the case where the A and M electrodes are making good contact with the formation, i.e., $R_a=R_m=0$, it can be shown that the voltage measured by voltmeter 57 in FIG. 2A would equal 0.1 volts (i.e., 100 volts/1 × $10^6$ ohms 0.1×$10^3$ ohms). However, now consider what happens when $R_a$ and/or $R_m=\infty$. In this case, it can be seen that the voltage measured by voltmeter 57 will be 0 volts, thus giving an inaccurate resistivity measurement. However, it can be shown that there are a range of contact resistances for which a "short normal" measuring device will produce reasonably accurate results because of the high values of $R_i$ and $R_o$, i.e., the contact resistances $R_a$ and $R_m$ must be relatively high before they have a significant effect on either the amount of current emitted by the A-electrode or the voltage measured by the meter 57. Thus, for example, if $R_a=R_m=100,000$ ohms, the measured voltage will be approximately 0.083 volts instead of the correct value of 0.1 volts. Taking another example, if $R_a=R_m=1\times10^6$ ohms, the measured voltage will be approximately 0.025 volts. Thus, it can be seen that a so-called "short normal" device will produce reasonably good results for relatively high values of contact resistance. However, it is also to be noted that the higher are the contact resistances $R_a$ and $R_m$, the lower will be the measured voltage, and thus measured resistivity. This is undesirable because the log analyst will not know whether very conductive formations are being logged or whether the electrodes are making poor contact.

Now consider what happens when the shunt resistor $R_s$ is connected across the A and M electrodes. When the contact resistances $R_a$ and $R_m$ are both small compared to $R_s$, the shunt resistor $R_s$ has a negligible affect on the measurements. Therefore, the system will operate in the same manner as discussed above for the short normal arrangement to give relatively accurate measured values of formation resistivity.

Now consider what happens when the contact resistance $R_a$ is small compared to $R_s$ but the contact resistance $R_m$ is very large, approaching infinity. In this case, the voltmeter 57 will measure the voltage at the A electrode instead of the voltage at the M electrode. In other words, the system will behave as a monoelectrode system with the A electrode acting as the monoelectrode. Taking a specific example of this for comparison with the example given above in connection with the short normal device, if $R_a=0$, $R_m=\infty$, $R_s=500,000$ ohms, for example, ($R_i=R_o=1$ megohms, $V_{source}=100$ volts as specified earlier), it can be seen that the voltage at the A electrode in this case will be 0.15 volts. However, the voltage measured by the voltmeter 57 will be 0.1 volts because of the voltage dividing action of the resistors $R_s$ and $R_i$. This is the same as the measured value of 0.1 volts when both the A and M electrodes are making good contact, i.e., $R_a=R_m=0$. Now keeping $R_m=\infty$ and increasing the value of $R_a$, it can be seen that if $R_a$ is equal to 1,000 ohms, the voltage at the A electrode will be approximately 0.25 volts and the voltage measured by the voltmeter 57 will be approximately 0.167 volts which compares favorably with the true value of 0.1 volts. When $R_a$ is equal to 2,000 ohms, the voltage measured by voltmeter 57 will be approximately 0.23 volts; when $R_a$ equals 10,000 ohms, the measured voltage will be approximately 0.77 volts, etc.

Now consider what happens when $R_a$ is equal to infinity and $R_m$ has a small value relative to $R_s$. In this case, the current supplied by the voltage source 55 will pass through shunt resistor $R_s$ and into the formations via the M electrode thus converting the system into a monoelectrode system with the electrode M being the monoelectrode. Thus, taking some examples of this, if $R_m=0$, the measured voltage will be 0.1 volts; if $R_m$ goes to 1,000 ohms, the measured voltage will be 0.167 volts; if $R_m=2,000$ ohms, the measured voltage is 0.23 volts; if $R_m=10,000$ ohms, the measured voltage is approximately 0.77 volts, etc. It will be noted that these values of measured voltage are identical with the values given for the case where $R_m=\infty$.

Now consider the case where both $R_a$ and $R_m$ are large compared to $R_s$. In this case, the system will be in error and will read a very high formation resistivity. Thus, when $R_a$ and $R_m$ are sufficiently high to be considered open circuits, the voltage measured by the voltmeter 57 will be at a value determined by the voltage divider network $R_o$, $R_s$ and $R_i$ fed by the voltage source 55. Thus, in the present numerical example, this voltage will increase to a value of approximately 40 volts. To prevent the resistor $R_s$ from overheating, the Zener diodes 54 and 55 limit the voltage drop across $R_s$ to a predetermined safe value.

Summarizing the description of the system of FIG. 2A when utilizing the shunt resistor $R_s$, it can be seen that so long as $R_a$ and $R_m$ are both reasonably low in value, the circuit will tend to operate as a short normal circuit to provide reasonably accurate values of formation resistivity. When the contact resistance $R_a$ becomes very high, the system will switch to operating as a monoelectrode system through the M electrode. On the other hand, when $R_m$ goes very high, the system will switch to monoelectrode operation through the A-electrode. Furthermore, when $R_a$ and $R_m$ become relatively high in value approaching the value of $R_i$ and $R_o$, the resistivity measurements will still be reasonably accurate due to the affect of the shunt resistor $R_s$. It will be recalled from the discussion of the short normal configuration (the FIGS. 2 and 2A circuit without the shunt resistor $R_s$) that the measured voltage, and thus resistivity, becomes low as the contact resistance $R_a$ and/or $R_m$ becomes low. However, with the shunt resistor $R_s$ in the circuit, it will tend to compensate somewhat for the reduced values of measured resistivity since $R_s$ will draw some current from the voltage source 55 for application to the measure amplifier 51 when the contact resistances $R_a$ and/or $R_m$ begin increasing to thus raise somewhat the value of voltage measured by voltmeter 57.

However, it has been found that when the values of $R_a$ and $R_m$ are near the values of $R_i$ and $R_o$, the measurements become so inaccurate as to be almost worthless. As stated earlier, the shunt resistor $R_s$ causes the measured voltage to become high when the contact resistances $R_a$ and $R_m$ become high. By proper selection of the various resistance values and recording scale range, the resistivity measurements can be made to go off-scale when the contact resistances reach predetermined critical levels. This is to be contrasted with the short normal configuration where high contact resistances produced low-resistivity readings. Thus, it can be seen that when using the configuration of FIGS. 2 and 2A erroneous measurements produced by high contact resistances can be ignored instead of being mistaken for low-resistivity formations.

It should be noted here that the exact value of the shunt resistor $R_s$ will depend to a great extent on the electrode spacings and size as well as the values of $R_i$ and $R_o$. (The electrode spacings and size determine the relationship of the equivalent formation resistors to one another.) Once these parameters are chosen, the value of the shunt resistor $R_s$ can then be selected to produce the most desirable results.

The above results can be accomplished with other methods than those described above. For example, three separate measurements could be made, the first using the A and M electrodes in the short normal configuration, the second utilizing the A electrode as a monoelectrode, and a third measurement using the M electrode as a monoelectrode. Either multiple frequency or time-sharing techniques could be utilized to obtain the separate measurements. These three measurements could then be combined in such a way that when the two monoelectrode measurements indicate an apparent resistivity below a predetermine value (in other words, when the contact resistances $R_a$ and $R_m$ are not too high) the short normal measurement would be accepted as reliable. If, on the other hand, when either the A or M electrode measurements, or both, are above a predetermined level, the short normal measurement could be rejected and furthermore the output of the system will go to a saturated or off-scale value at the high end of the resistivity scale.

Thus, turning to FIG. 3, there is shown such a system for simultaneously providing short normal and monoelectrode measurements and determining when to use the short normal measurement. In FIG. 3, a signal generator 60 operating at a first frequency $f_1$ energizes the A electrode of the pad member 19 (as well as any other pads). A second signal generator 61 operating at a second frequency $f_2$ energizes the M electrode. Furthermore, a third signal generator 62 operating at a third frequency $f_3$ energizes the A electrode. All three signal generators 60, 61 and 62 are returned to the B electrode in the same manner as in FIG. 2. A band-pass filter 63 selects only those signals at the frequency $f_1$ for application to a voltage-measuring circuit 64 which could comprise, for example, a measure amplifier and phase-sensitive detector energized by the signal generator 60 in the same manner as the measure amplifier 51 and phase-sensitive detector 52 of FIG. 2. The voltage measuring circuit 64 will, therefore, produce a DC output signal proportional to the voltage of the signal at frequency $f_1$ on the A electrode. A second band-pass filter 65 having a center frequency of $f_2$ and adapted to block the frequencies $f_1$ and $f_3$ passes the signal at frequency $f_2$ to another voltage-measuring circuit 66 which can be constructed in the same manner as voltage-measuring circuit 64. A third band-pass filter 67 constructed to pass all signals at the frequency $f_3$ and block all signals at the frequencies $f_1$ and $f_2$ passes the signals at the frequency $f_3$ to a voltage-measuring circuit i68 which can be constructed in the same manner as the voltage-measuring circuits 64 and 66.

The output signal from the voltage-measuring circuit 64 will give a measure of the resistivity as measured by the A electrode connected as a monoelectrode. Likewise, it can be seen that the output signal from voltage-measuring circuit 66 will be proportional to the resistivity measured when the M electrode is connected as a monoelectrode. The output signal from the voltage-measuring circuit 68 will give a measure of the resistivity measured by the system operating in the short normal mode of operation. The short normal resistivity measurement from the voltage-measuring circuit 68 is then applied to an amplifier 69 by way of a double-throw relay switch 70 for transmission to the surface of the earth to enable indications of formation resistivity to be obtained.

As stated earlier, whenever the contact resistance of either the A or M electrode exceeds some predetermined value, the resistivity measurements derived from a short normal-type measuring device will no longer produce useful resistivity measurements. To prevent these short normal-type resistivity measurements from being transmitted to the surface of the earth when such conditions exist, the A and M electrode measurements produced by the voltage measuring circuits 64 and 66 are applied to a logic circuit 75 which causes a relay 73 to be energized when the measure voltage on either electrode A or M exceeds a predetermined threshold level. Inside the logic circuit 75, the output signals from voltage measuring circuits 64 and 68 are applied to a pair of voltage-sensitive triggers 71 and 72 respectively which each produce an output signal whenever the applied input voltage exceeds the predetermined threshold level. The outputs of the triggers 71 and 72 are then applied to the relay 73 via an OR gate 74. When energized, the relay 73 causes the relay switch 70 to disconnect the amplifier 69 from the measuring circuit 68 and connect a positive DC voltage to the amplifier 69. This DC voltage is sufficiently high to drive the indicating device at the surface of the earth off-scale thereby indicating that the measurements are no longer valid.

It would also be possible in connection with the FIG. 3 embodiment to include the shunt resistor $R_s$ between the A and M electrodes for the short normal configuration only and still utilize the A and M monoelectrode measurements as an aid in evaluating the short normal resistivity measurements. Therefore in FIG. 3, the shunt resistor $R_s$ is connected in series with a band-pass filter 76 constructed to pass only those signals at the frequency $f_3$ and block any signals at the frequencies $f_1$ and $f_2$. A switch 76 is also connected in series with the filter 76 and resistor $R_s$ to select the mode of operation. Thus, for the short normal configuration only a shunt resistor $R_s$ is connected across the A and M electrodes for the same purposes as discussed in connection with FIGS. 2 and 2A.

By utilizing the shunt resistor $R_s$ in the short normal configuration only, the above-described advantages derived from using this shunt resistor $R_s$ can be obtained with the FIG. 3 apparatus also. The A and M monoelectrode measurements produced by the voltage-measuring circuits 64 and 66 can then be utilized to energize the relay 73 whenever the short normal measurements produced by the voltage measuring circuit 68 are no longer feasible. As stated earlier, when utilizing the shunt resistor $R_s$ with the short normal configuration, reliable measurements are obtained whenever neither $R_a$ nor $R_m$ are too high (e.g., whenever $R_a$ and $R_m$ are somewhat below the values of $R_i$ and $R_o$) and also when either $R_a$ or $R_m$ approaches infinity without the other contact resistance $R_a$ or $R_m$ being too high. Thus, it is clear that the short normal resistivity measurements derived when using the shunt resistor $R_s$ should be ignored only when both $R_a$ and $R_m$ coincidentally are above a predetermined value or when a predetermined relationship of the contact resistance values $R_a$ or $R_m$ to one another fails to satisfy a predetermined condition. A suitable logic circuit could be substituted for the logic circuit 75 to energize the relay 73 under the proper conditions.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for use in investigating subsurface earth formations traversed by a borehole, comprising:

a plurality of electrodes adapted for movement through a borehole;

means for supplying current between first and second ones of said electrodes for emission into an earth formation;

means for measuring the potential on a third one of said electrodes located near said first electrode to provide a measure of the resistance of a formation portion; and an impedance element having one end connected to said first electrode and the other end connected to said third electrode for providing a current path through said impedance element to said third electrode and said measuring means, the impedance of said impedance element being substantially greater than said formation resistance.

2. Apparatus for investigating subsurface earth formations traversed by a borehole, comprising:

a plurality of electrodes adapted for movement through a borehole;

means for supplying current between first and second ones of said electrodes for emission into an earth formation;

means for measuring the potential on a third one of said electrodes located near said first electrode to provide a measure of the resistance of a formation portion; and an impedance element having one end connected to said first electrode and the other end connected to said third electrode for providing relatively significant amounts of the current through said impedance element to said measuring means or said third electrode for emission into a formation whenever said first and/or third electrode does not make reasonably good electrical contact with a formation, the impedance of said impedance element being substantially greater than said formation resistance.

3. Apparatus for investigating subsurface earth formations traversed by a borehole, comprising:

means for carrying at least one wall-engaging pad member for passage through a borehole;

a plurality of electrodes, at least some of said electrodes being mounted on the borehole wall-engaging face of said pad member;

means for supplying current to a first one of said pad-mounted electrodes for emission into an earth formation, said emitted current returning to a remote location for return to said current-supplying means;

means for measuring the potential on a second one of said pad-mounted electrodes, located near said first electrode to provide a measure of the resistance of a formation portion; and an impedance element having one end connected to said first electrode and the other end connected to said second electrode for providing a current path through said impedance element to said measuring means and said second electrode, the impedance of said impedance element being substantially greater than said formation resistance.

4. Apparatus for investigating subsurface earth formations traversed by a borehole, comprising:

means for carrying at least one wall-engaging pad member for passage through a borehole;

a plurality of electrodes, at least some of said electrodes being mounted on the borehole wall-engaging face of said pad member;

means for supplying current to a first one of said pad-mounted electrodes for emission into an earth formation, said emitted current returning to a remote location for return to said current-supplying means;

means for measuring the potential on a second one of said pad-mounted electrodes located near said first electrode to provide a measure of a formation characteristic; and a resistor connected between said first and second electrodes and having a suitable resistance value to provide a significant amount of current through said second electrode to a formation whenever said first electrode does not make reasonably good electrical contact with a formation and for providing a significant amount of current to said measuring means from said current supply means whenever said second electrode alone or both of said electrodes together do not make reasonably good electrical contact with a formation.

5. Apparatus for investigating subsurface earth formations traversed by a borehole, comprising:

means for carrying a plurality of wall-engaging pad members for passage through a borehole;

a plurality of electrodes, at least some of which are mounted on the borehole wall-engaging faces of said pad members;

means for supplying current to a first electrode on each pad member for emission into an earth formation adjoining each pad member;

separate means associated with each pad member for measuring the potential on a second electrode located near said first electrode on each pad member to provide individual measurements of a formation characteristic; and impedance means connected between said first and second electrodes on each pad member for providing a significant amount of current through said second electrode on each pad member to a formation whenever said first electrode on each pad member does not make reasonably good electrical contact with a formation and for providing a significant amount of current from said current supply means to said measuring means associated with each pad member whenever either said second electrode alone or both said first and second electrodes together of each pad member do not make reasonably good electrical contact with a formation.

6. Apparatus for investigating subsurface earth formations traversed by a borehole, comprising:

means for carrying at least one wall-engaging pad member for passage through a borehole;

a plurality of electrodes, at least some of said electrodes being mounted on the borehole wall-engaging face of said pad member;

means for supplying current to a first pad-mounted electrode for emission into an earth formation, said emitted current returning to a return electrode;

means for measuring the potential difference between a second pad-mounted electrode located near said first electrode and a relatively remote point to provide a measure of the resistance of a formation portion; and an impedance element having one end connected to said first electrode and the other end connected to said second electrode for providing a current path through said impedance element to said measuring means and/or said second electrode whenever said first and/or second electrode does not make reasonably good electrical contact with a formation, the impedance of said impedance element being substantially greater than said formation resistance.